L. H. MAYNARD.
GAS WATER HEATING APPARATUS.
APPLICATION FILED FEB. 26, 1915.
1,180,266.
Patented Apr. 18, 1916.
2 SHEETS—SHEET 1.
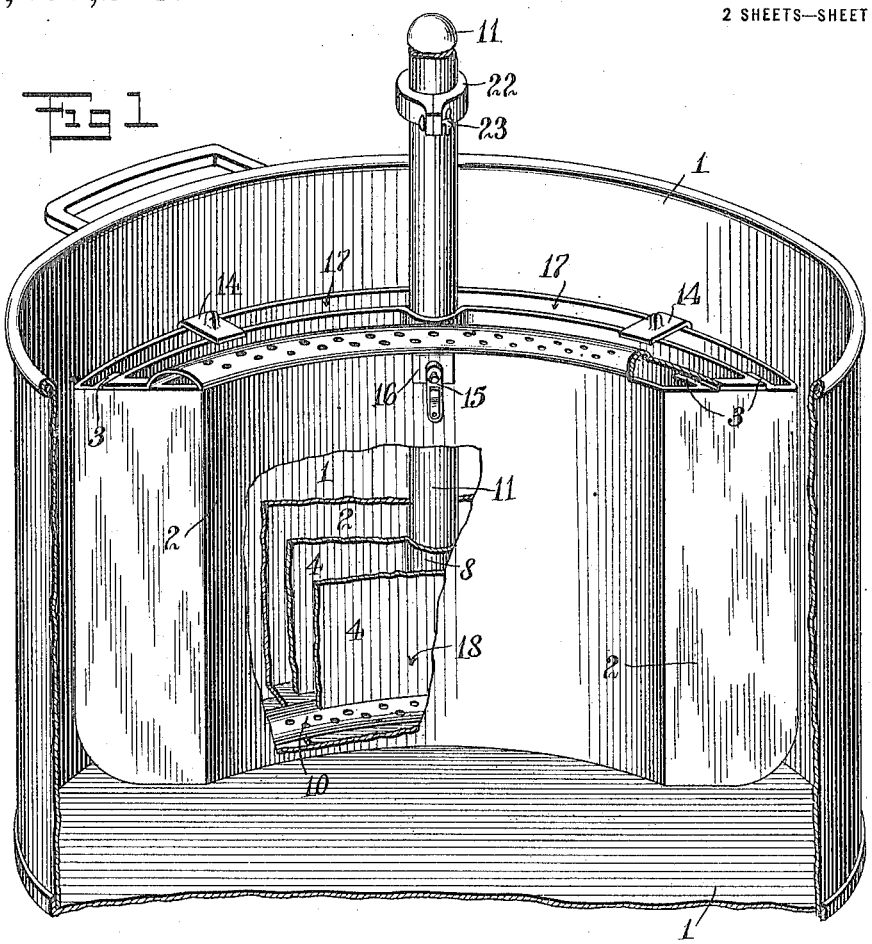
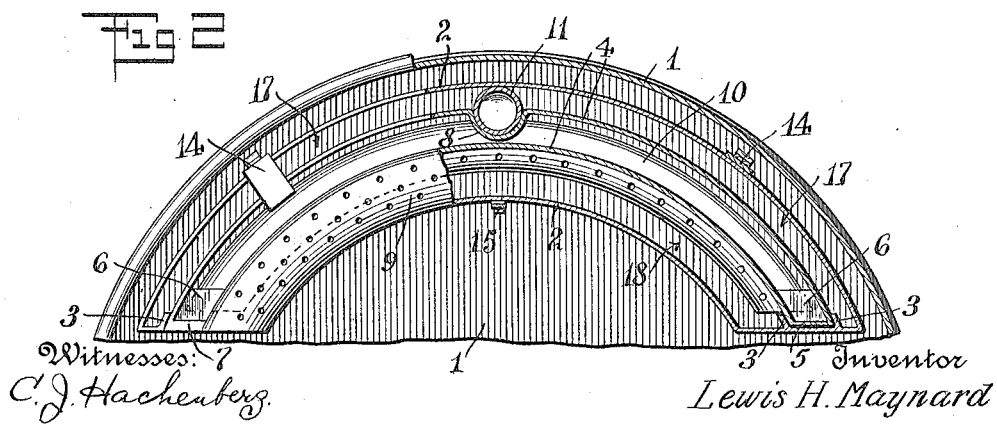
Witnesses:
C. J. Hachenberg.
Samuel Turvey
Inventor
Lewis H. Maynard
By his Attorney

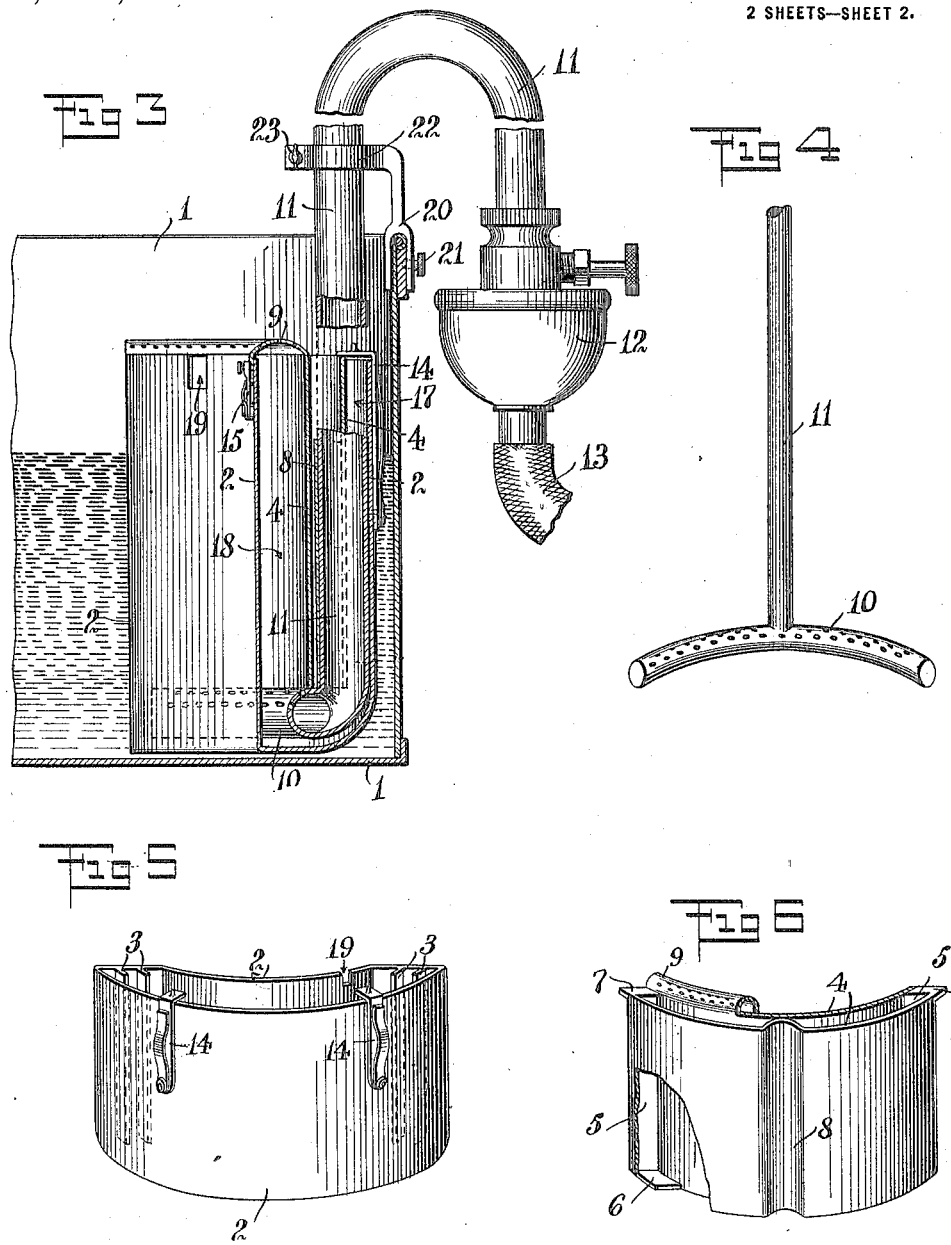

UNITED STATES PATENT OFFICE.

LEWIS H. MAYNARD, OF NEW YORK, N. Y., ASSIGNOR TO SAMUEL G. SUPPLEE & COMPANY, OF NEW YORK, N. Y., A CORPORATION OF NEW YORK.

GAS WATER-HEATING APPARATUS.

1,180,266. Specification of Letters Patent. Patented Apr. 18, 1916.

Application filed February 26, 1915. Serial No. 10,812.

*To all whom it may concern:*

Be it known that I, LEWIS H. MAYNARD, a citizen of the United States, residing at New York, Bronx county, State of New York, have invented certain new and useful Improvements in Gas Water-Heating Apparatus, of which the following is a full, clear, and exact description.

This invention relates to gas heating apparatus of the type designed to give, if desired, different strata of heated areas, with different degrees of heat for the different strata. Such conditions are desirable when dental molding composition is being used.

The present invention is particularly designed to provide a heat radiating body arranged for insertion within a container, this body having a gas burner therewithin, with means for adjustably supporting the body within the container and relatively to its base. It frequently happens that electric current is not easily accessible or is not installed in a building, so that a gas heater of this type is very desirable for dental and other work wherein gas is to be utilized as a heating medium.

A preferable embodiment of the invention is illustrated in the accompanying drawings forming part of this specification, and in which,—

Figure 1 is a perspective view of a liquid container in the form of a water pan, the gas heating body being supported within the container, part of the container and the heater bodies being broken away to disclose the interior arrangements. Fig. 2 is a top plan view, partially in section, of the parts shown in Fig. 1. Fig. 3 is a vertical transverse section through the container and heater element. Fig. 4 is a detached view of the burner tube. Fig. 5 is a detached view of the casing of the heater body. Fig. 6 is a perspective view of one of the parts of the heater body.

Referring to the drawings by numerals, 1 indicates a water pan or other liquid container, in the present case of circular form.

2 indicates the outer casing of a heater body adapted to be suspended within the container, and within the liquid therein, to heat said liquid. This body is of a configuration to correspond with the internal configuration of the container so that it will occupy space and may be positioned against the side wall of said container. In this present embodiment I preferably form the casing 2 annular in configuration so that a maximum heat radiating surface is afforded, and so that minimum space is occupied within the container. This casing 2 at its ends is provided with spaced guiding ribs 3 to receive an attachment of framing for the burner. This attachment comprises an annular casing 4, open at its top and partially open at its bottom, the side walls 4 being curved to correspond with the curve, substantially, of the casing 2, and the end walls 5 being designed to fit between the guides 3. These end walls at their base have inwardly extending feet 6 and at their upper ends have outwardly offset ears 7. The outer side wall 4 is intended to provide a substantially semicircular channel 8, and the inner wall has its upper end extended and inwardly bent to form a hood portion 9. The burner is designed to rest beneath this annular body and is constructed to coöperate therewith as follows: A curved burner tube 10 is provided shaped to extend beneath this annular body, the ears 6 thereof resting upon the upper face of the burner, perforations being provided in the inner face of this tube for the escape of gas. A gas conduit 11 is connected to the burner 10 at a point offset outwardly thereof and substantially centrally of the length of the tube. This gas conduit 11 is designed at its inner face to rest within the channel 8 of the body and at its outer face to engage the outer face of the body 2, spacing the outer wall 4 from said body, providing between the outer wall 4 and the outer wall of the casing 2 an air passage through which air may be drawn to the burner tube 10. It will be understood of course that this air passage is located at both sides of the gas pipe 11. This pipe extends upwardly from the heater body 2 and is preferably bent downwardly as shown, a gas and air mixer 12 of any suitable design being preferably employed to which a flexible tubing 13 or any other desirable form of conduit may be attached.

When the parts of the burner body are assembled, the outer wall 4 is positioned against the gas tube 11 with the latter resting within the channel 8 thereof, and with the feet 6 resting upon the upper face of the burner tube 10. The parts are then inserted within the outer casing 2, the ends 5 being inserted within the guides 3 of said outer body, the parts being lowered until the offset ears 7 rest upon the top of the body. In order to detachably hold the parts in this assembled position I preferably employ suitable latching means, such as the spring pressed fingers 14, mounted upon the outer wall of the casing and extending over to engage the outer wall 4 of the inserted burner part. On the inner wall of the casing a spring pressed latch 15 may be provided, its latch-pin coöperating with an aperture formed in an ear 16 projecting downwardly from the hood 9. The burner, gas tube and the casing carried thereby are therefore rigidly held in operative assembled relation to the outer casing 2 of the heater body. By referring particularly to Figs. 1, 2 and 3 it will be seen that the gas tube 11 provides air intake passages 17 at either side of the pipe 11 and that the lower surface of the burner tube 10 is positioned above the base of the body 2 so that the air may be drawn through the passage 17 and into a combustion chamber 18 between the inner wall 4 and the inner wall of the outer casing 2. The hood 9 extends over the upper end of this combustion chamber to shield the operator from the flame and from the heat, the top of the heater body being to all intents and purposes open for the intake of air and for the escape of burnt gases. The flame will impinge against the lower portion of the inner wall of the casing 2 so that if this inner wall is positioned at or adjacent the bottom of the container 1 the liquid in the bottom of the container will be heated to a higher degree than the liquid adjacent the top of the container. The inner wall 2 of the outer casing may be provided with an aperture 19 through which a taper, match or other lighting medium may be inserted to light the gas from the burner tube 10.

In order to support the heater body in various positions of elevation relative to the liquid container, and in the liquid at various elevations, I have provided a support which detachably engages the container and adjustably supports the heater body. One form which such means may take comprises the clamp shown particularly in Fig. 3 of the drawings, embodying a U-shaped base 20 engaging the upper edge of the side wall of the container and having a fastening or set screw 21. From the base 20 the supporting means extends upwardly and is offset to form an annular clasp 22, this clasp being preferably of the hinged sectional type and being provided with the clamping screw 23, by means of which the gas tube 11 is gripped and held with the heater body 2 at the desired position relative to the container body. Inasmuch as the tube is held rigid with respect to the heater body, by means of its engagement with the feet 6 and wall 8, and by means of the engagement of the latches 14 with said wall, and of the latch 16 with the hood 9, adjustment of the tube 11 vertically of the container 1 effects likewise adjustment of the heater body and of the point of application of the maximum heat. Therefore it will be seen that by raising or lowering the tube 11, the point at which the greatest heat radiates from the body 2 is likewise raised and lowered so that different strata of heated areas, with different degrees of heat of the different strata, may be provided through this burner. Furthermore by making the burner and its coöperating parts detachable, the parts may be readily removed for the purpose of cleansing or adjustment, and in addition as the supporting means is removable the whole device is rendered very compact for shipment or storage and, owing to its construction, is readily assembled.

The height of the heat radiating casing 2 will be of course equal at least to the greatest depth of liquid designed to be held in the container, so that there is no possibility of "drowning out" the flame.

While I have herein described a specific embodiment of the invention, it will of course be understood that the same is susceptible of various modifications both in structure and in relative arrangement of parts, within the spirit of the invention and the scope of the appended claims.

What I claim therefore and desire to secure by Letters Patent is:

1. A gas water heater comprising an outer casing, a burner seated therein having an upwardly extending supply tube, a frame seated on said burner, means detachably securing said frame to the outer casing whereby to permit of the casing being suspended by the burner supply tube, and means adjustably engaging said supply tube to support said heater in a liquid container.

2. A gas water heater comprising a casing, a frame detachably engaged in said casing having spaced walls spaced from the walls of the casing to provide an inlet for the air and a combustion space and a burner in said casing discharging into said combustion space.

3. A gas water heater comprising a casing, a frame engaged in said casing having walls spaced from the walls of the casing to provide an air intake and a combustion space, a burner in the casing discharging into said combustion space and a perforated hood on the top of the casing covering said combustion space.

4. A gas water heater comprising a casing provided with guide ways on the inner wall thereof, a frame engaged in said guide ways having walls spaced from the walls of the casing, clips detachably securing the frame in the casing and a burner in the casing held in place by said frame.

5. A gas water heater comprising a casing, a burner in said casing having an upwardly extending supply tube engaging one wall of the casing, a member engaged in the casing having walls defining chambers in the casing and provided with a recess in one wall receiving the supply tube of the burner to thereby clamp the supply tube against the wall of the casing and means for detachably securing said chamber-defining member in the casing.

6. A gas water heater comprising a casing provided with vertical guide ways on the inner walls thereof, a burner in the casing at the foot of said guide ways, a frame engaged in said guide ways and bearing on top of the burner, this frame having spaced walls spaced from the walls of the casing, means for detachably securing the frame in the casing and means for adjustably supporting the heater in a liquid container.

LEWIS H. MAYNARD.

Witnesses:
CHARLES J. HACHENBERG,
HENDERSON F. HILL.

Copies of this patent may be obtained for five cents each, by addressing the "Commissioner of Patents, Washington, D. C."